Patented Feb. 28, 1950

2,499,290

UNITED STATES PATENT OFFICE 2,499,290

PROCESS FOR PREPARING PENICILLIN

Quentin R. Bartz, Detroit, Mich., assignor to Parke, Davis & Company, Detroit, Mich., a corporation of Michigan No Drawing. Application April 22, 1944, Serial No. 532,355

13 Claims. (Cl. 260—302)

The invention relates to the preparation of products derived from the mold, *Penicillium notatum*, which possess high activity against pathogenic microorganisms.

It is known that the said species of mold, *Penicillium notatum*, produces a substance called penicillin having high activity against certain microorganisms. However, penicillin is produced by *Penicillium notatum* only in very small amount and associated with impurities which are very difficult to remove.

A further difficulty in the way of obtaining penicillin is that its activity is quickly lost in the presence of chemicals and solvents, required for its isolation and purification, unless low temperatures, suitable pH values and other conditions are carefully controlled.

Example

A 100 pound lot of wheat bran whole culture of *Penicillium notatum* approximately 3 days old, prepared for example as described in copending application of Katherine Yaw, Serial No. 466,669, filed November 23, 1942, now abandoned, is extracted with a total volume of 72 gallons of 95% denatured alcohol (formula No. 3A containing methanol as a denaturant). The alcoholic extract is concentrated in vacuo. During the main part of the distillation, the temperature of the distilling liquid should be below 77° F. (25° C.). Toward the end of the distillation, the temperature of the distilling liquid rises but must be prevented from going above about 98.6° F. (37° C.). The concentration process whereby alcohol is removed to leave an aqueous concentrate is discontinued when one small volume of concentrate upon being shaken with an equal volume of diethyl ether produces an aqueous layer equal to or slightly greater than the original volume. At this point the volume is about 4 gallons.

Variations in the moisture content of the bran culture cause a wide variation in the final volume of the aqueous concentrate. If too much alcohol remains in it, the next step of extracting oily impurities will be interfered with. On the other hand, if an attempt is made to bring the concentrate to dryness, loss of activity occurs. Usually, alcohol can be removed until the concentrate from 100 lbs. of culture comes down to a volume of about 2.4 to 4.8 gallons.

The pH of the concentrate is determined to be about 6.5. If the pH is below 5, it should be brought within the range of about 5 to 7 by the careful addition of ice cold normal sodium hydroxide solution. Locally high concentrations of alkali during this addition should be avoided since the activity is destroyed by an excess alkalinity.

The concentrate is chilled without delay in a refrigerator at about 23° F. to 32° F. (—5° C. to 0° C.). It is then allowed to stand at this temperature for about 24 hours, at the end of which time the top layer is peeled or skimmed off and discarded.

The cold aqueous layer that remains is treated without delay in order to extract oily impurities. Its pH is determined and found to be 6.2. If the pH is below about 6, it should be adjusted to a pH of about 6.0 to 7.6 by careful addition of ice cold normal sodium hydroxide solution, while avoiding destruction of activity by excessive local concentrations of alkali. The aqueous layer is then extracted first with an equal volume of peroxide free ether and then with one half its volume of ether. The ether extracts are discarded.

The ether extracted aqueous layer is cooled to less than 41° F. (5° C.) and one-half its volume of similarly cooled ethylene dichloride added. After the ethylene dichloride is added, the pH is adjusted to a value within the range of about 1.9 to 3.0 by cautiously adding ice cold molar phosphoric acid ($H_3PO_4$). A brownish precipitate frequently forms during this acidification. The particle size of this precipitate apparently depends upon the rate of addition of the acid and the conditions of stirring. The stirring should not be too vigorous or a troublesome emulsion may be produced.

The mixture is allowed to separate into two layers, the lower ethylene dichloride layer drawn off and stored at once at low temperature (e. g. 41° F.). The aqueous layer is washed twice with one-half its volume of ethylene dichloride and all of the ethylene dichloride extracts combined and stored at 5° C. The highly pigmented aqueous layer is discarded.

I have found that the penicillin activity is quickly destroyed in a few minutes at room temperature when the pH of the aqueous solution is around pH 2. Hence, the importance of first adding ethylene dichloride, before increasing the acidity by means of aqueous acid, and then carrying out the above ethylene dichloride extraction rapidly and at a low temperature. Once the extraction is accomplished, the activity of the penicillin is stable for several days.

About 28.4 grams of a suitable charcoal, such as the commercially produced superheated steam-activated product known as "Norit," is added to the cold ethylene dichloride extract for each galion of extract. Too much Norit is not used, lest the penicillin itself be absorbed. The mixture with Norit is stirred for about 15 minutes, filtered, and the Norit washed twice with a small quantity of ethylene dichloride. For example, about 57 ml. of ethylene dichloride for each 28.4 grams of Norit used can be employed for each washing. It is preferred that the Norit be treated with hydrochloric acid, filtered and then washed until chloride-free before using it to treat the ethylene dichloride solution of penicillin.

The ice cold filtrate and washings from the Norit treatment are combined. They contain the penicillin. A gallon of this filtrate is taken and to it there is added 200 ml. of ice cold pyrogen-free distilled water. The mixture is stirred, cold normal sodium hydroxide solution added carefully, and the aqueous layer adjusted to pH about 6.5 to 7.0. Locally high concentrations of alkali and excess alkalinity are avoided in this step in order to keep from destroying the penicillin activity. The aqueous layer contains the sodium salt of penicillin.

The remainder of the ethylene dichloride filtrate from the Norit treatment is divided into five equal parts. The above mentioned aqueous layer or extract containing the sodium salt of penicillin is used to extract one of these five equal parts, after adjusting the aqueous layer in the same manner as before with cold pyrogen-free distilled water and alkali. The aqueous layer or extract thus obtained is then used to extract the four remaining parts in turn, alkali being added again each time to adjust the pH to about 6.5 to 7.0.

In the above removal of penicillin from the ethylene dichloride layer into an aqueous layer, the water and ethylene dichloride are first mixed before adjusting to a higher pH. This results in some of the penicillin being extracted into the aqueous layer at pH about 3, which is in the unstable range for penicillin. Hence, the neutralization must proceed without delay and care must be taken not to overstep the end point. I have found that the penicillin is fairly stable in aqueous solution at pH 8.3, but that the activity is rapidly destroyed even in the cold (41° F. or 5° C.) at pH 11.3.

The dissolved ethylene dichloride is removed from the aqueous extract in high vacuum at 68° to 86° F. (20° to 30° C.). The solution is then assayed for penicillin activity by the "cup method" as described by Abraham et al., Lancet 2:177, August 16, 1941, and later by Florey et al., Brit. J. Exp. Path. and Med. 23:120. June, 1942. The solution contains more than 2500 units per ml., as a unit is defined in said publications. It is put into ampoules or vials and stored at 5° C. until ready for use.

The solutions are stable for weeks at 5° C. but it is preferred to put the solution into open ampoules or vials, freeze the same and then dry the contents by evaporation at low temperature and pressure while in the frozen state. The sealed ampoules of dried material are then stable for long periods and the penicillin product contained therein readily redissolves in water.

The above example is given by way of illustration of a prepared process for obtaining penicillin in accordance with my invention but it should be understood that the invention is capable of many variations. Thus, instead of using ether for extracting oily impurities from the aqueous solution at pH 6.0 to 7.6, I may use other water-immiscible solvents for oily impurities which are not solvents for appreciable an. of penicillin at said pH values, such for example as ethylene dichloride, chloroform, amyl acetate, etc. Also, instead of using ethylene dichloride in the extraction step prior to the treatment with activated charcoal, I may use other water-immiscible organic liquids which are solvents for penicillin at a pH of 1.9 to 3.0, such for example as ether, chloroform, amyl acetate, etc.

My invention, in its broader aspects, is based on my discovery that activated charcoal may be used to selectively adsorb impurites away from the active penicillin, thus providing a means for obtaining, on a commercial scale, a highly purified penicillin product without substantial loss of penicillin activity.

What I claim as my invention is:

1. A process for obtaining penicillin from an organic extract containing the same, which comprises treating said organic extract with activated charcoal to adsorb impurities upon said charcoal, and separating the organic extract containing unadsorbed penicillin from the charcoal and impurities.

2. A process for obtaining penicillin from an ethylene dichloride extract containing the same, which comprises treating said extract with activated charcoal, and separating the ethylene dichloride extract containing unadsorbed pencillin from the charcoal and impurities.

3. A process for obtaining penicillin from an ethylene dichloride extract containing the same, which comprises treating said extract with activated charcoal in a proportion on the order of 28 grams of charcoal to each gallon of extract, separating the extract containing unadsorbed penicillin from the charcoal, and washing the charcoal with a small amount of ethylene dichloride to remove such amounts of penicillin as are adsorbed.

4. A process for obtaining penicillin which comprises treating an aqueous solution containing penicillin at least partially freed from oils and at approximately neutral pH with an organic solvent at a temperature not substantially above 5° C. while quickly thereafter adding aqueous mineral acid to adjust the pH of the aqueous phase to a value between about 1.9 and 3.0, separating and discarding the aqueous phase, treating the organic solvent extract with activated charcoal to adsorb impurities upon said charcoal, and separating the organic extract containing unadsorbed penicillin from the charcoal and impurities.

5. A process for obtaining penicillin which comprises treating an aqueous solution containing penicillin at least partially freed from oils and at approximately neutral pH with ethylene dichloride at a temperature not substantially above 5° C. while quickly thereafter adding aqueous mineral acid to adjust the pH of the aqueous phase to a value between about 1.9 and 3.0, separating and discarding the aqueous phase, treating the ethylene dichloride extract with activated charcoal to adsorb impurities upon said charcoal, and separating the ethylene dichloride extract containing unadsorbed penicillin from the charcoal and impurities.

6. A process for obtaining penicillin which comprises treating an aqueous solution containing penicillin at least partially freed from oils and at approximately neutral pH with ethylene dichloride at a temperature not substantially above 5° C. while quickly thereafter adding aqueous phosphoric acid to adjust the pH of the aqueous phase to a value between about 1.9 and 3.0, separating and discarding the aqueous phase, treating the ethylene dichloride extract with activated charcoal to adsorb impurities upon said charcoal, and separating the ethylene dichloride extract containing unadsorbed penicillin from the charcoal and impurities.

7. A process for obtaining penicillin from a slightly acidic aqueous extract of a penicillin-producing mold culture, which comprises chilling said aqueous extract to produce solid impurities therein, separating said impurities, extracting further impurities from the aqueous residue at approximately neutral pH with ether, adding an organic solvent to the ether-extracted aqueous residue, quickly thereafter adding aqueous mineral acid to mixture to adjust the pH of the aqueous phase to a value between about 1.9 and 3.0, separating and discarding the aqueous phase, treating the organic solvent extract with activated charcoal to adsorb impurities upon said charcoal, and separating the organic extract containing unadsorbed penicillin from the charcoal and impurities.

8. A process for obtaining penicillin from a slightly acidic aqueous extract of a penicillin-producing mold culture, which comprises chilling said aqueous extract to produce solid impurities therein, separating said impurities, extracting further impurities from the aqueous residue at approximately neutral pH with ether, adding ethylene dichloride to the ether-extracted aqueous residue, quickly thereafter adding aqueous mineral acid to mixture to adjust the pH of the aqueous phase to a value between about 1.9 and 3.0, separating and discarding the aqueous phase, treating the ethylene dichloride extract with activated charcoal to adsorb impurities upon said charcoal, and separating the organic extract containing unadsorbed penicillin from the charcoal and impurities.

9. A process for obtaining penicillin from a slightly acidic aqueous extract of a penicillin-producing mold culture, which comprises chilling said aqueous extract to produce solid impurities therein, separating said impurities, extracting further impurities from the aqueous residue at approximately neutral pH with ether, adding ethylene dichloride to the ether-extracted aqueous residue, quickly thereafter adding aqueous phosphoric acid to mixture to adjust the pH of the aqueous phase to a value between about 1.9 and 3.0, separating and discarding the aqueous phase, treating the ethylene dichloride extract with activated charcoal to adsorb impurities upon said charcoal, and separating the organic extract containing unadsorbed penicillin from the charcoal and impurities.

10. A process for obtaining penicillin from a slightly acidic aqueous extract of a penicillin-producing mold culture, which comprises chilling said aqueous extract to produce solid impurities therein, separating said impurities, extracting further impurities from the aqueous residue at approximately neutral pH with a water-immiscible organic solvent for oily impurities, adding an organic solvent to the extracted aqueous residue, quickly thereafter adding aqueous mineral acid to mixture to adjust the pH of the aqueous phase to a value between about 1.9 and 3.0, separating and discarding the aqueous phase, treating the organic solvent extract with activated charcoal to adsorb impurities upon said charcoal, and separating the organic extract containing unadsorbed penicillin from the charcoal and impurities.

11. The process for purifying partially purified penicillin material, which comprises adding to a solution of the penicillin in a non-polar water immiscible solvent, a relatively small proportion of surface-active carbon, thereby adsorbing the impurities without substantial adsorbtion of the penicillin, and then separating the carbon, with impurities adsorbed, from the purified penicillin solution.

12. A process for obtaining penicillin from a chloroform extract containing the same, which comprises treating said extract with activated charcoal, and separating the chloroform extract containing unadsorbed penicillin from the charcoal and impurities.

13. A process for obtaining penicillin from an amyl acetate extract containing the same, which comprises treating said extract with activated charcoal, and separating the amyl acetate extract containing unadsorbed penicillin from the charcoal and impurities.

QUENTIN R. BARTZ.

REFERENCES CITED

The following references are of record in the file of this patent:

Lancet, August 16, 1941, pages 177–189.

British Journal of Experimental Pathology, vol. 23, No. e, June 1942, pages 103–122.

Manufacturing Chemist & Manufacturing Perfumer, August 1943, XIV, pages 251–254.

Charles Pfizer, Report No. 1, January 2, 194 (pages 2 and 22).

Chem. & Met. Engineering, April 1944, Artice by J. C. Callaham, 10 pages photostat.